US010001892B2

(12) United States Patent
Yang (10) Patent No.: US 10,001,892 B2
(45) Date of Patent: Jun. 19, 2018

(54) SELF-CAPACITIVE TOUCH AND FORCE SENSING APPARATUS AND SELF-CAPACITIVE TOUCH AND FORCE SENSING METHOD

(71) Applicant: Raydium Semiconductor Corporation, Hsinchu (TW)

(72) Inventor: Chen-Wei Yang, Hsinchu (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 30 days.

(21) Appl. No.: 15/408,469

(22) Filed: Jan. 18, 2017

(65) Prior Publication Data

US 2017/0205915 A1 Jul. 20, 2017

Related U.S. Application Data

(60) Provisional application No. 62/280,169, filed on Jan. 19, 2016.

(51) Int. Cl.
*G06F 3/044* (2006.01)
*G06F 3/041* (2006.01)

(52) U.S. Cl.
CPC .......... *G06F 3/044* (2013.01); *G06F 3/0418* (2013.01); *G06F 2203/04105* (2013.01); *G06F 2203/04107* (2013.01)

(58) Field of Classification Search
CPC ...................................................... G06F 3/044
See application file for complete search history.

(56) References Cited

U.S. PATENT DOCUMENTS 9,501,195 B1 * 11/2016 Kim ................. G06F 3/044
345/173
2015/0268783 A1 * 9/2015 Yoon .................. G06F 3/0414
345/173

* cited by examiner

*Primary Examiner* — Sanghyuk Park (57) ABSTRACT

A self-capacitive touch and force sensing apparatus includes a metal layer, a sensing component layer, an air gap layer and a processing module. The sensing component layer is disposed above metal layer. The air gap layer is formed between metal layer and sensing component layer. When the self-capacitive touch and force sensing apparatus is operated in a self-capacitive touch sensing mode, metal layer is driven and synchronized with a touch signal, so that no capacitive effect between sensing component layer and metal layer and a first capacitance change is sensed; when the self-capacitive touch and force sensing apparatus is operated in a self-capacitive force sensing mode, metal layer is grounded, so that there is a capacitive effect between sensing component layer and metal layer and a second capacitance change is sensed. The processing module obtains a third capacitance change according to first capacitance change and second capacitance change.

20 Claims, 8 Drawing Sheets

SELF-CAPACITIVE TOUCH AND FORCE SENSING APPARATUS AND SELF-CAPACITIVE TOUCH AND FORCE SENSING METHOD

BACKGROUND OF THE INVENTION

1. Field of the Invention

This invention relates to touch and force sensing, especially to a self-capacitive touch and force sensing apparatus and a self-capacitive touch and force sensing method.

2. Description of the Prior Art

In general, in the conventional laminated structure of capacitive touch and force sensing apparatus, independent capacitive force sensing component is usually necessary and additional metal shielding layer disposed under the capacitive force sensing component is also necessary to prevent the capacitive force sensing component from sensing the capacitance change (namely the noise) from below. In addition, additional flexible printed circuit (FPC) and force sensing control pin or chip are also needed in the conventional capacitive touch and force sensing apparatus; therefore, the laminated structure and manufacturing processing of the conventional capacitive touch and force sensing apparatus will become complicated and the cost will also become higher.

SUMMARY OF THE INVENTION

Therefore, the invention provides a self-capacitive touch and force sensing apparatus and a self-capacitive touch and force sensing method to solve the above-mentioned problems.

An embodiment of the invention is a self-capacitive touch and force sensing apparatus. In this embodiment, the self-capacitive touch and force sensing apparatus is capable of being operated in a self-capacitive touch sensing mode and a self-capacitive force sensing mode. The self-capacitive touch and force sensing apparatus includes a metal layer, a sensing component layer, an air gap layer and a processing module. The sensing component layer is disposed above the metal layer. The air gap layer is formed between the metal layer and the sensing component layer. The processing module is coupled to the metal layer and the sensing component layer. Wherein, when the self-capacitive touch and force sensing apparatus is operated in the self-capacitive touch sensing mode, the metal layer is driven and synchronized with a touch signal, so that no capacitive effect between the sensing component layer and the metal layer and a first capacitance change is sensed; when the self-capacitive touch and force sensing apparatus is operated in the self-capacitive force sensing mode, the metal layer is grounded, so that there is a capacitive effect between the sensing component layer and the metal layer and a second capacitance change is sensed; the processing module obtains a third capacitance change according to the first capacitance change and the second capacitance change.

In an embodiment, the first capacitance change only includes a capacitance change caused by touch.

In an embodiment, the second capacitance change includes a capacitance change caused by touch and a capacitance change caused by force.

In an embodiment, the first capacitance change is minus from the second capacitance change by the processing module to obtain the third capacitance change.

In an embodiment, the third capacitance change only includes a capacitance change caused by force.

In an embodiment, the metal layer is in a whole piece form or a patterned form.

In an embodiment, the self-capacitive touch and force sensing apparatus further includes an optical conductive layer disposed between the metal layer and the air gap layer.

In an embodiment, the optical conductive layer is in a whole piece form or a patterned form.

In an embodiment, the self-capacitive touch and force sensing apparatus is applied to a self-capacitive touch panel.

In an embodiment, the self-capacitive touch panel has an in-cell laminated structure, an on-cell laminated structure or an out-cell laminated structure.

Another embodiment of the invention is a self-capacitive touch and force sensing method. In this embodiment, the self-capacitive touch and force sensing method is applied to a self-capacitive touch and force sensing apparatus capable of being operated in a self-capacitive touch sensing mode and a self-capacitive force sensing mode, the self-capacitive touch and force sensing apparatus includes a metal layer, a sensing component layer and an air gap layer, the sensing component layer is disposed above the metal layer, the air gap layer is formed between the metal layer and the sensing component layer. The self-capacitive touch and force sensing method includes steps of: when the self-capacitive touch and force sensing apparatus is operated in the self-capacitive touch sensing mode, driving and synchronizing the metal layer with a touch signal, so that no capacitive effect between the sensing component layer and the metal layer and a first capacitance change is sensed; when the self-capacitive touch and force sensing apparatus is operated in the self-capacitive force sensing mode, grounding the metal layer, so that there is a capacitive effect between the sensing component layer and the metal layer and a second capacitance change is sensed; and obtaining a third capacitance change according to the first capacitance change and the second capacitance change.

Compared to the prior art, the self-capacitive touch and force sensing apparatus and the self-capacitive touch and force sensing method of the invention control the voltage level of the metal layer and the self-capacitive sensing component layer and perform digital processing to obtain accurate capacitance changes caused by touch and force under the condition of sharing sensing component in the touch sensing mode and the force sensing mode. The self-capacitive touch and force sensing apparatus and the self-capacitive touch and force sensing method of the invention can achieve the following advantages and effects:

(1) When the self-capacitive touch and force sensing apparatus of the invention performs self-capacitive touch sensing, the metal layer in its laminated structure will be driven to be synchronized with the touch signal, so that the self-capacitive sensing component layer can be prevented from the increasing of RC loading caused by the metal layer below; when the air gap layer between the self-capacitive sensing component layer and the metal layer is deformed by force, no effects of capacitance change will be generated. At this time, the self-capacitive sensing component layer will only sense the capacitance change caused by touch. Therefore, the external environmental noise from below can be effectively blocked to enhance the signal-noise ratio (SNR) of touch sensing.

(2) When the self-capacitive touch and force sensing apparatus of the invention performs self-capacitive force sensing, the metal layer in its laminated structure will be grounded to replace the conventional metal shielding layer, so that the self-capacitive sensing component layer can be prevented from the noise from below. When the air gap layer between the self-capacitive sensing component layer and the metal layer is deformed by force, there will be capacitance change generated and sensed by the self-capacitive sensing component layer. Therefore, the self-capacitive sensing component layer can sense the capacitance changes caused by touch and force at the same time.

(3) The self-capacitive touch and force sensing apparatus of the invention can obtain accurate capacitance change caused by force according to the combined capacitance change sensed under the self-capacitive force sensing mode and the touch capacitance change sensed under the self-capacitive touch sensing mode and multi-points force sensing can be also achieved.

The advantage and spirit of the invention may be understood by the following detailed descriptions together with the appended drawings.

DETAILED DESCRIPTION OF THE INVENTION

A preferred embodiment of the invention is a self-capacitive touch and force sensing apparatus. In this embodiment, the self-capacitive touch and force sensing apparatus can be operated under a self-capacitive touch sensing mode and a self-capacitive force sensing mode respectively. In fact, the self-capacitive touch and force sensing apparatus can be applied to a self-capacitive touch panel, and the self-capacitive touch panel can have an in-cell laminated structure, an on-cell laminated structure and an out-cell laminated structure, but not limited to this.

Figure 1:
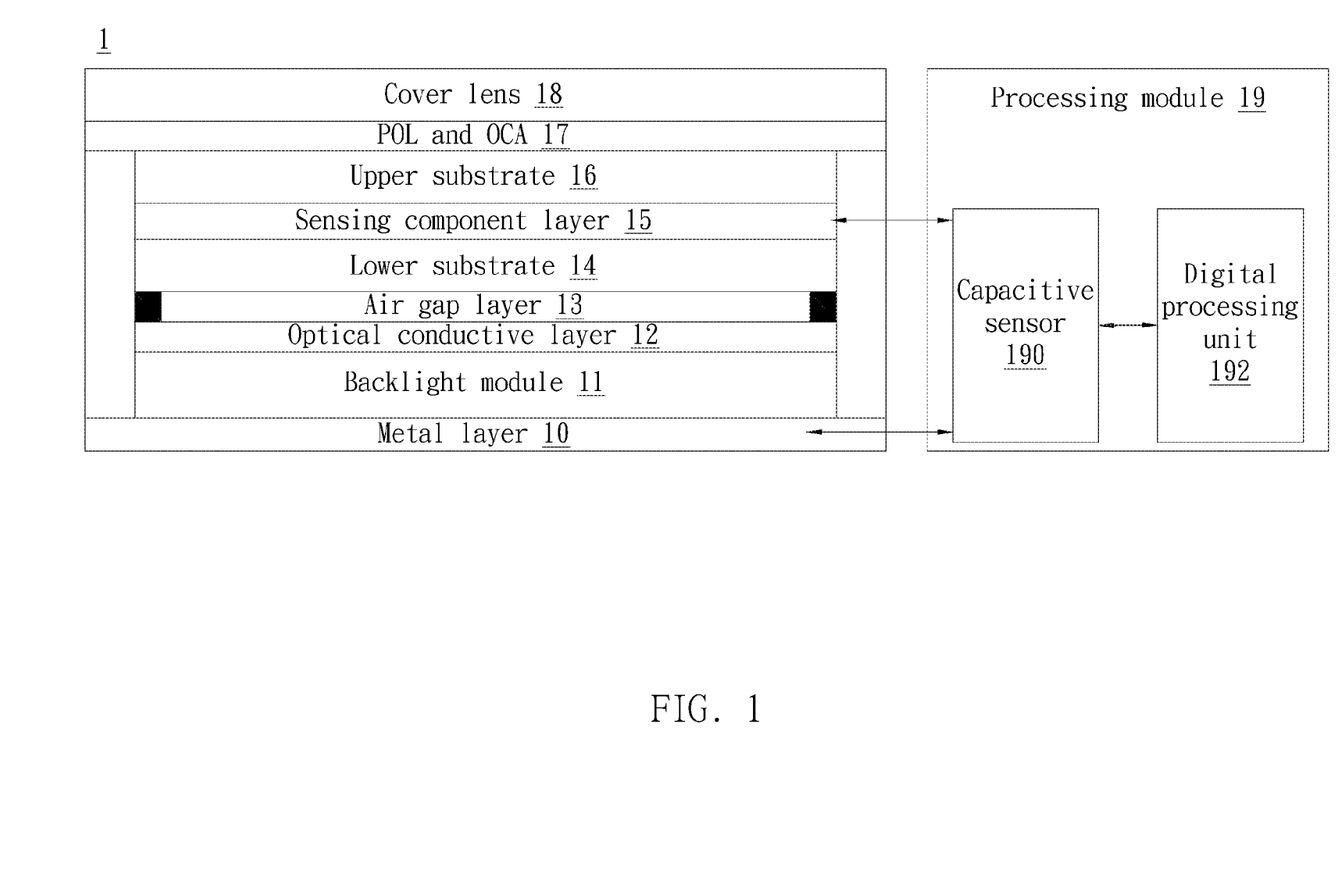
FIG. 1 illustrates a schematic diagram of the self-capacitive touch and force sensing apparatus in a preferred embodiment of the invention.

Please refer to FIG. 1. FIG. 1 illustrates a schematic diagram of the self-capacitive touch and force sensing apparatus in a preferred embodiment of the invention.

As shown in FIG. 1, the self-capacitive touch and force sensing apparatus 1 at least includes a metal layer 10, an air gap layer 13, a sensing component layer 15 and a processing module 19. Wherein, the sensing component layer 15 is disposed above the metal layer 10. The air gap layer 13 is disposed between the metal layer 10 and the sensing component layer 15. The processing module 19 includes a capacitive sensor 190 and a digital processing unit 192. The capacitive sensor 190 is coupled to the metal layer 10 and the sensing component layer 15 through analog bus. The digital processing unit 192 is coupled to the capacitive sensor 190. In practical applications, the metal layer 10 can be in a whole piece form or a patterned form without specific limitations.

In addition, the self-capacitive touch and force sensing apparatus 1 can also include a backlight module 11, an optical conductive layer 12, a lower substrate 14, an upper substrate 16, a polarizer and optical clear adhesive (OCA) 17 and a cover lens 18. Wherein, the backlight module 11 and the optical conductive layer 12 are disposed between the metal layer 10 and the air gap layer 13, and the optical conductive layer 12 is located above the backlight module 11; the sensing component layer 15 is disposed between the lower substrate 14 and the upper substrate 16; the polarizer and optical clear adhesive (OCA) 17 and the cover lens 18 are disposed above the upper substrate 16, and the cover lens 18 is disposed above the polarizer and optical clear adhesive (OCA) 17. In practical applications, the optical conductive layer 12 can be in a whole piece form or a patterned form without specific limitations. It should be noticed that the capacitive sensor 190 is coupled to the metal layer 10 in this embodiment; however, the capacitive sensor 190 can be coupled to the optical conductive layer 12 based on practical needs to achieve the same effects.

Figure 2:
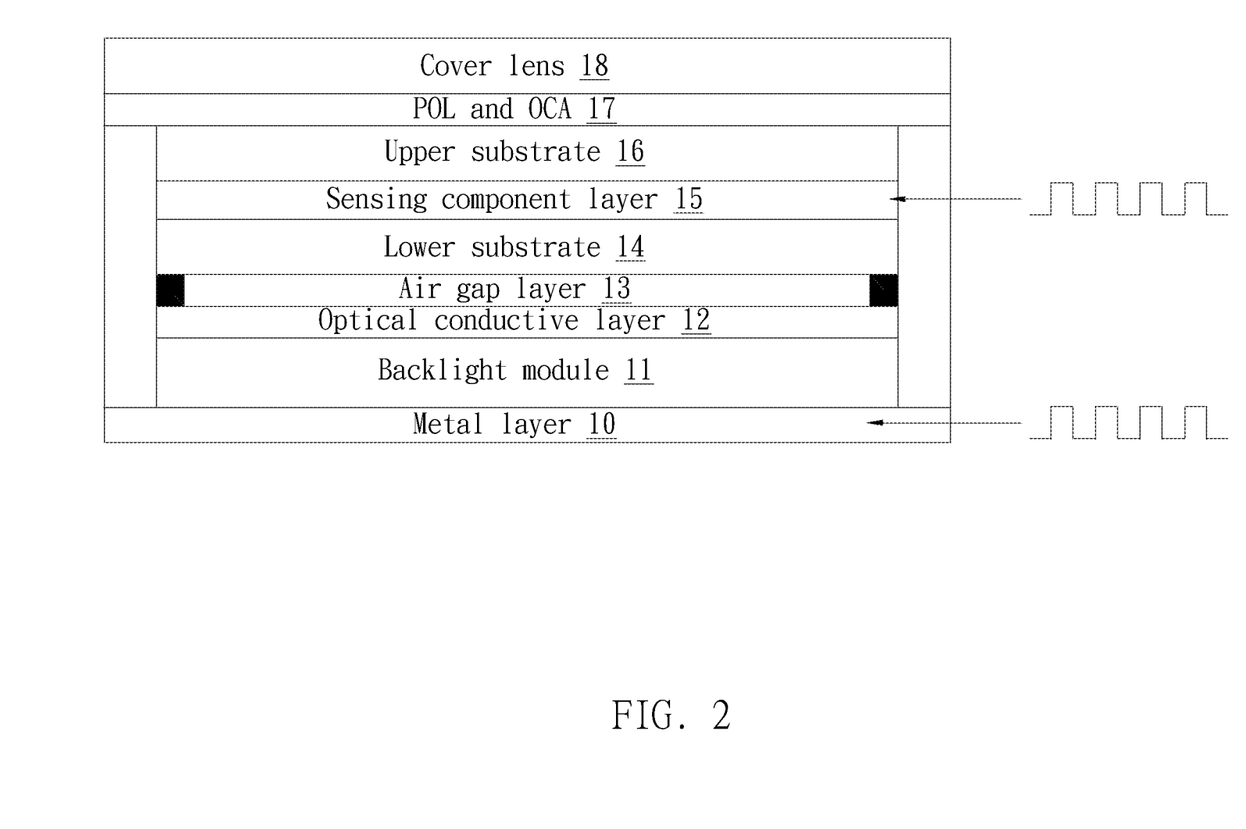
FIG. 2 illustrates a schematic diagram when the self-capacitive touch and force sensing apparatus is operated under the touch sensing mode and no touch has occurred yet.
Figure 3:
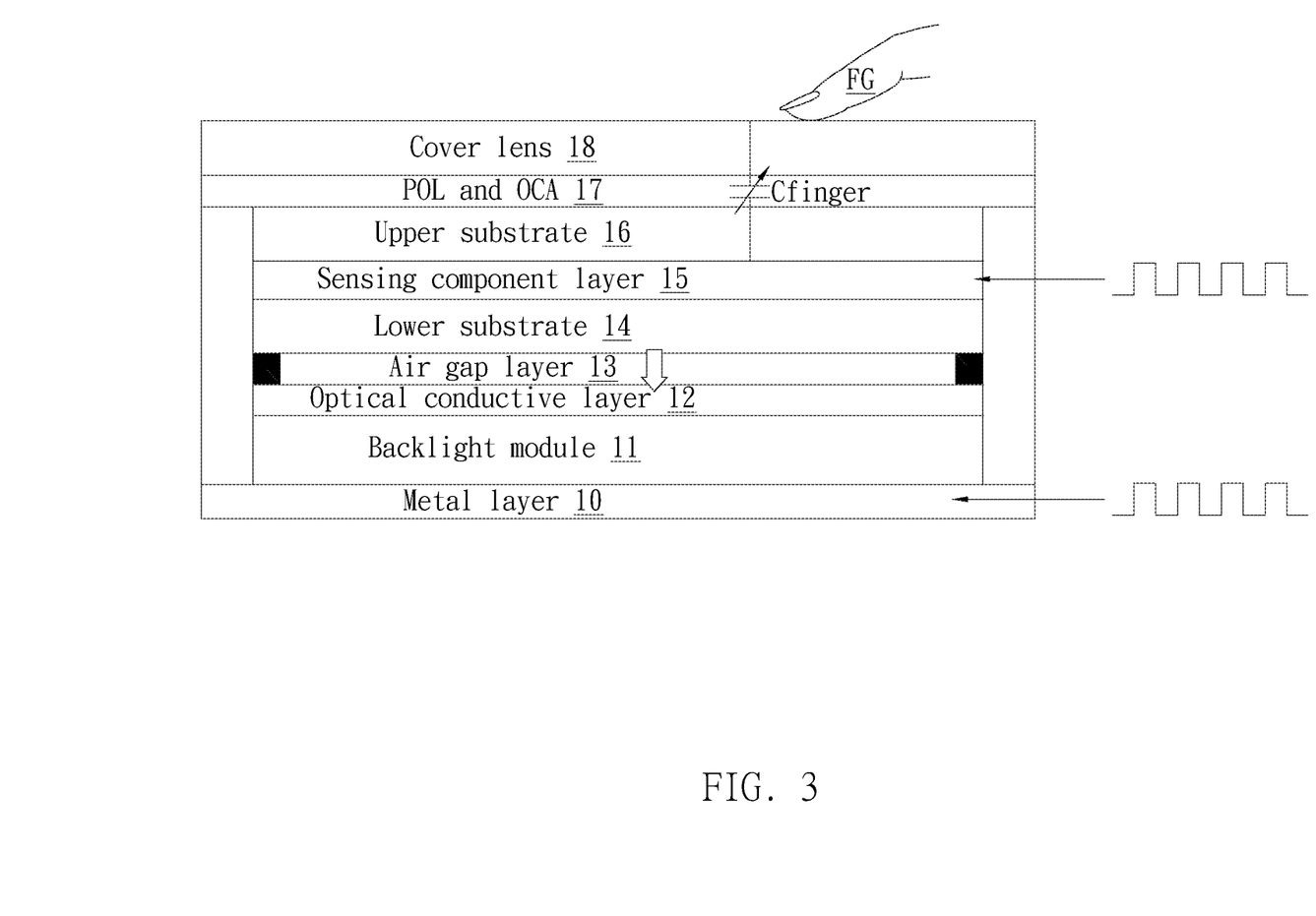
FIG. 3 illustrates a schematic diagram when the self-capacitive touch and force sensing apparatus is operated under the touch sensing mode and the touch has already occurred.

Then, please refer to FIG. 2 and FIG. 3. FIG. 2 illustrates a schematic diagram when the self-capacitive touch and force sensing apparatus is operated under the touch sensing mode and no touch has occurred yet; FIG. 3 illustrates a schematic diagram when the self-capacitive touch and force sensing apparatus is operated under the touch sensing mode and the touch has already occurred.

As shown in FIG. 2 and FIG. 3, when the self-capacitive touch and force sensing apparatus 1 is operated in the self-capacitive touch sensing mode, the metal layer 10 is driven and synchronized with a touch signal received by the sensing component layer 15, so that there will be no capacitive effect between the sensing component layer 15 and the metal layer 10.

It should be noticed that, if the capacitive sensor 190 is coupled to the optical conductive layer 12 instead of the metal layer 10, it will be optical conductive layer 12 driven and synchronized with the touch signal received by the sensing component layer 15, so that there will be no capacitive effect between the sensing component layer 15 and the optical conductive layer 12, and so on.

From FIG. 3, it can be found that when the self-capacitive touch and force sensing apparatus 1 is operated in the self-capacitive touch sensing mode, since there is no capacitive effect between the sensing component layer 15 and the metal layer 10, when being touched by a finger FG, even the thickness of the air gap layer 13 between the metal layer 10 and the sensing component layer 15 is changed, the sensing component layer 15 will not be affected accordingly. Therefore, when the capacitive sensor 190 outputs the capacitive sensing signal to the sensing component layer 15, the first capacitance change $\Delta C1$ sensed by the sensing component layer 15 will only include the capacitance change caused by touch (namely Cfinger shown in FIG. 3) without the capacitance change caused by force. Therefore, the external environmental noise from below can be effectively blocked to enhance the SNR of touch sensing.

In addition, the metal layer 10 driven to be synchronized with the touch signal can effectively prevent the sensing component layer 15 from being affected by the metal layer 10 below, so that the increasing of RC loading can be effectively avoided.

Figure 4:
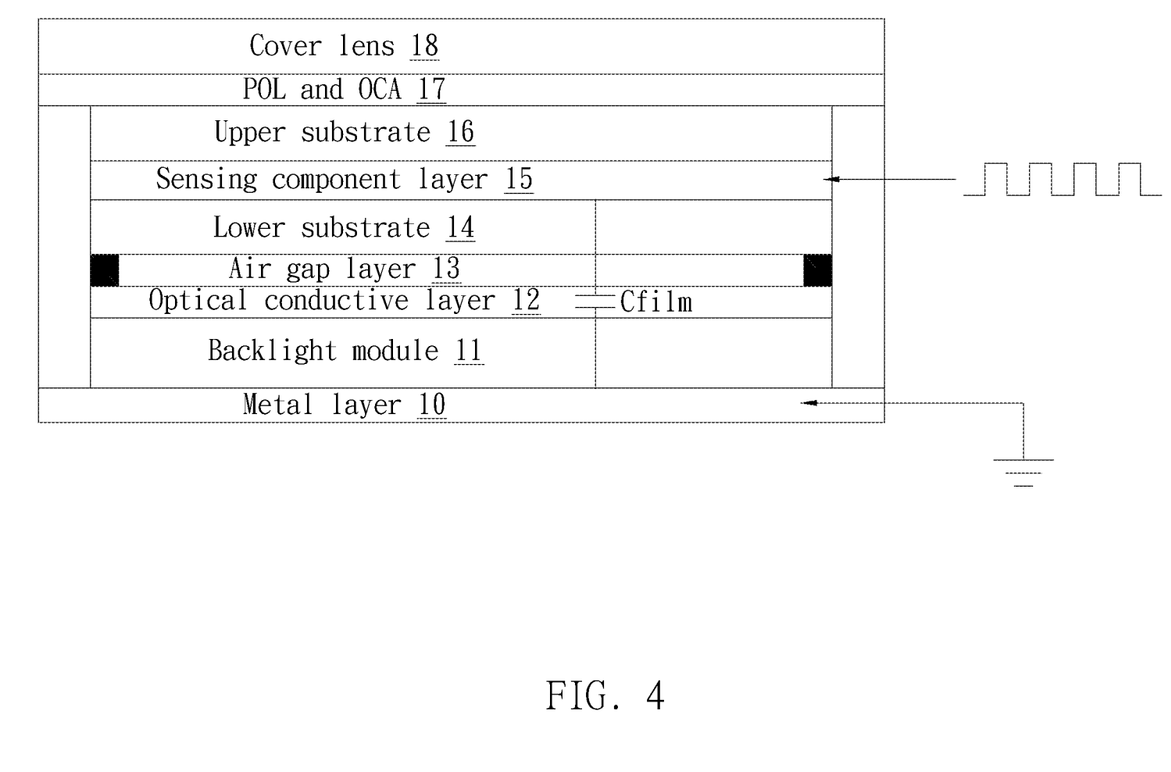
FIG. 4 illustrates a schematic diagram when the self-capacitive touch and force sensing apparatus is operated under the force sensing mode and no touch has occurred yet.
Figure 5:
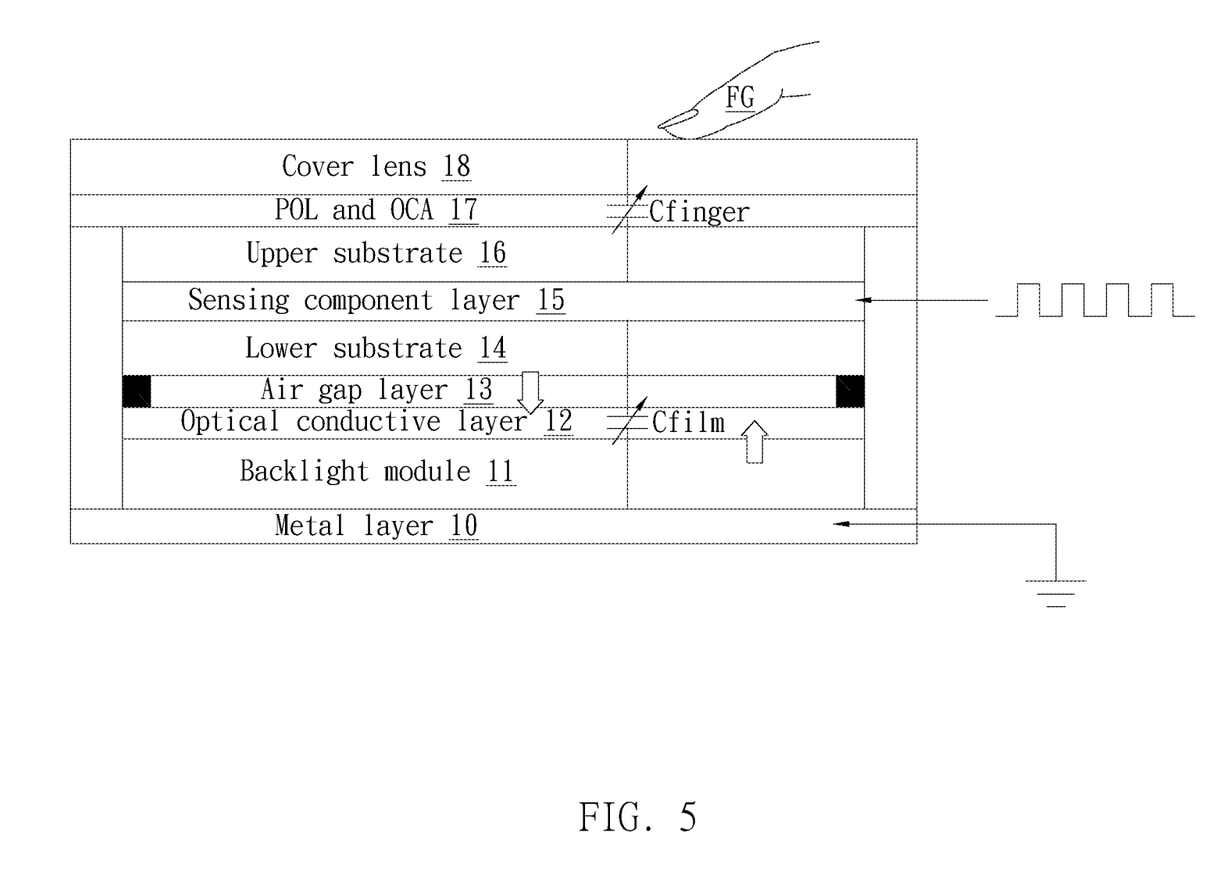
FIG. 5 illustrates a schematic diagram when the self-capacitive touch and force sensing apparatus is operated under the force sensing mode and the touch has already occurred.

Then, please refer to FIG. 4 and FIG. 5. FIG. 4 illustrates a schematic diagram when the self-capacitive touch and force sensing apparatus is operated under the force sensing mode and no touch has occurred yet; FIG. 5 illustrates a schematic diagram when the self-capacitive touch and force sensing apparatus is operated under the force sensing mode and the touch has already occurred.

As shown in FIG. 4 and FIG. 5, when the self-capacitive touch and force sensing apparatus 1 is operated in the self-capacitive force sensing mode, the metal layer 10 is grounded and the sensing component layer 15 still receives the touch signal, so that there will be capacitive effect occurred between the sensing component layer 15 and the metal layer 10, namely Cfilm shown in FIG. 4 and FIG. 5. It should be noticed that the metal layer 10 grounded can directly replace the conventional metal shielding layer to effectively prevent the sensing component layer 15 from the interference caused by the noise from below.

From FIG. 5, it can be found that when the self-capacitive touch and force sensing apparatus 1 is operated in the self-capacitive force sensing mode, since there is capacitive effect occurred between the sensing component layer 15 and the metal layer 10, when the thickness of the air gap layer 13 between the metal layer 10 and the sensing component layer 15 is changed due to the touch of the finger FG, the capacitance Cfilm between the metal layer 10 and the sensing component layer 15 will be changed and the sensing component layer 15 will be affected accordingly. Therefore, when the capacitive sensor 190 outputs the capacitive sensing signal to the sensing component layer 15, the second capacitance change ΔC2 sensed by the sensing component layer 15 will include the capacitance changes caused by touch and force at the same time.

At last, when the processing module 19 receives the first capacitance change ΔC1 sensed under the self-capacitive touch sensing mode and the second capacitance change ΔC2 sensed under the self-capacitive force sensing mode, since the first capacitance change ΔC1 only includes the capacitance change caused by touch and the second capacitance change ΔC2 includes the capacitance changes caused by touch and force at the same time, the processing module 19 can minus the first capacitance change ΔC1 from the second capacitance change ΔC2 to obtain a third capacitance change ΔC3 only including the capacitance change caused by force. By doing so, the self-capacitive touch and force sensing apparatus 1 can obtain accurate the touch capacitance change ΔC1 and the force capacitance change ΔC3, and multi-points force sensing can be also achieved.

Another embodiment of the invention is a self-capacitive touch and force sensing method. In this embodiment, the self-capacitive touch and force sensing method is applied to a self-capacitive touch and force sensing apparatus capable of being operated in a self-capacitive touch sensing mode and a self-capacitive force sensing mode, the self-capacitive touch and force sensing apparatus includes a metal layer, a sensing component layer and an air gap layer, the sensing component layer is disposed above the metal layer, the air gap layer is formed between the metal layer and the sensing component layer.

Figure 6:
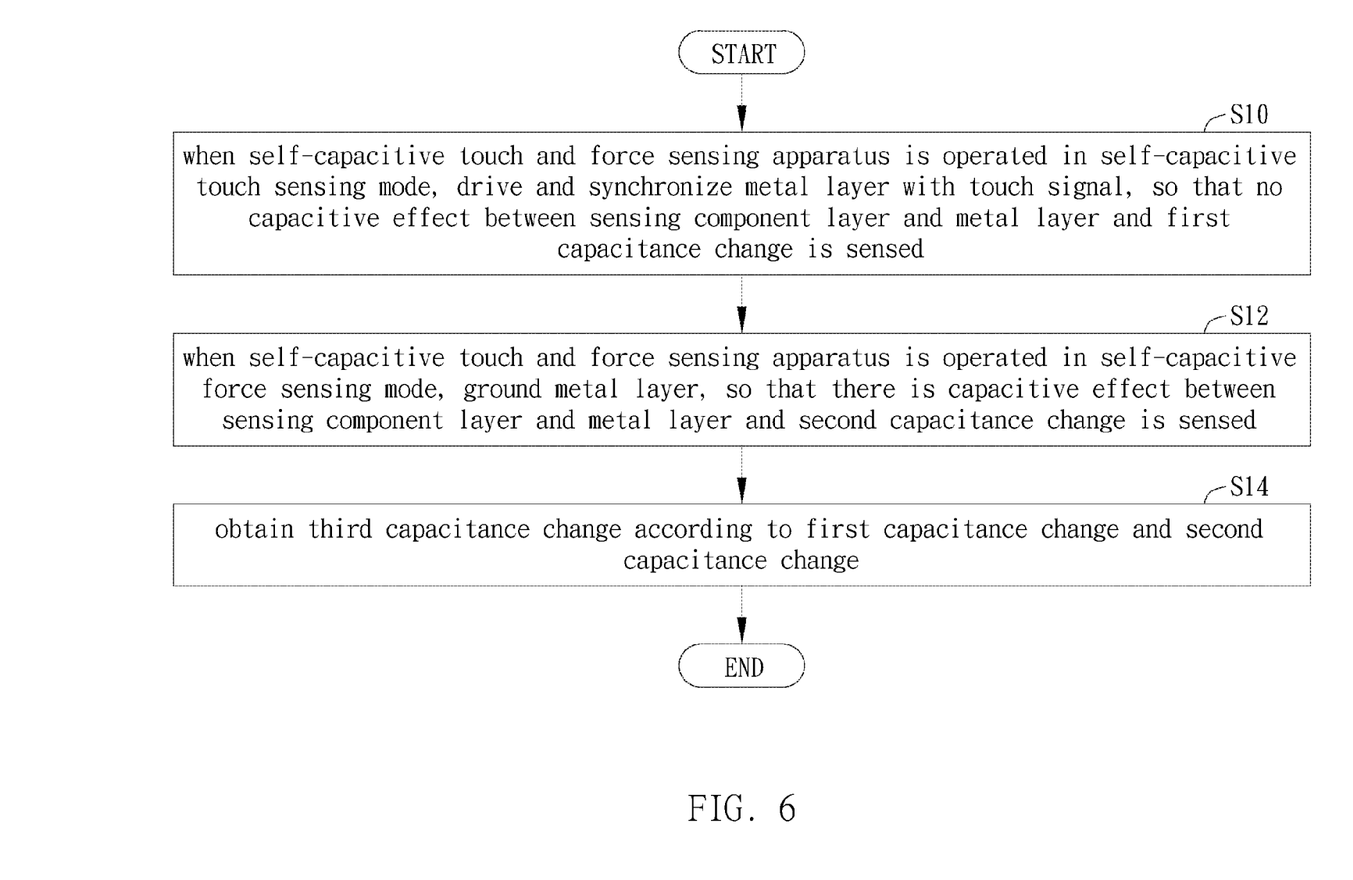
FIG. 6 illustrates a flowchart of the self-capacitive touch and force sensing method in another preferred embodiment of the invention.

Please refer to FIG. 6. FIG. 6 illustrates a flowchart of the self-capacitive touch and force sensing method in another preferred embodiment of the invention. As shown in FIG. 6, the self-capacitive touch and force sensing method can include following steps.

Step S10: when the self-capacitive touch and force sensing apparatus is operated in the self-capacitive touch sensing mode, driving and synchronizing the metal layer with a touch signal, so that no capacitive effect between the sensing component layer and the metal layer and a first capacitance change is sensed;

Step S12: when the self-capacitive touch and force sensing apparatus is operated in the self-capacitive force sensing mode, grounding the metal layer, so that there is a capacitive effect between the sensing component layer and the metal layer and a second capacitance change is sensed;

Step S14: obtaining a third capacitance change according to the first capacitance change and the second capacitance change.

Figure 7A:
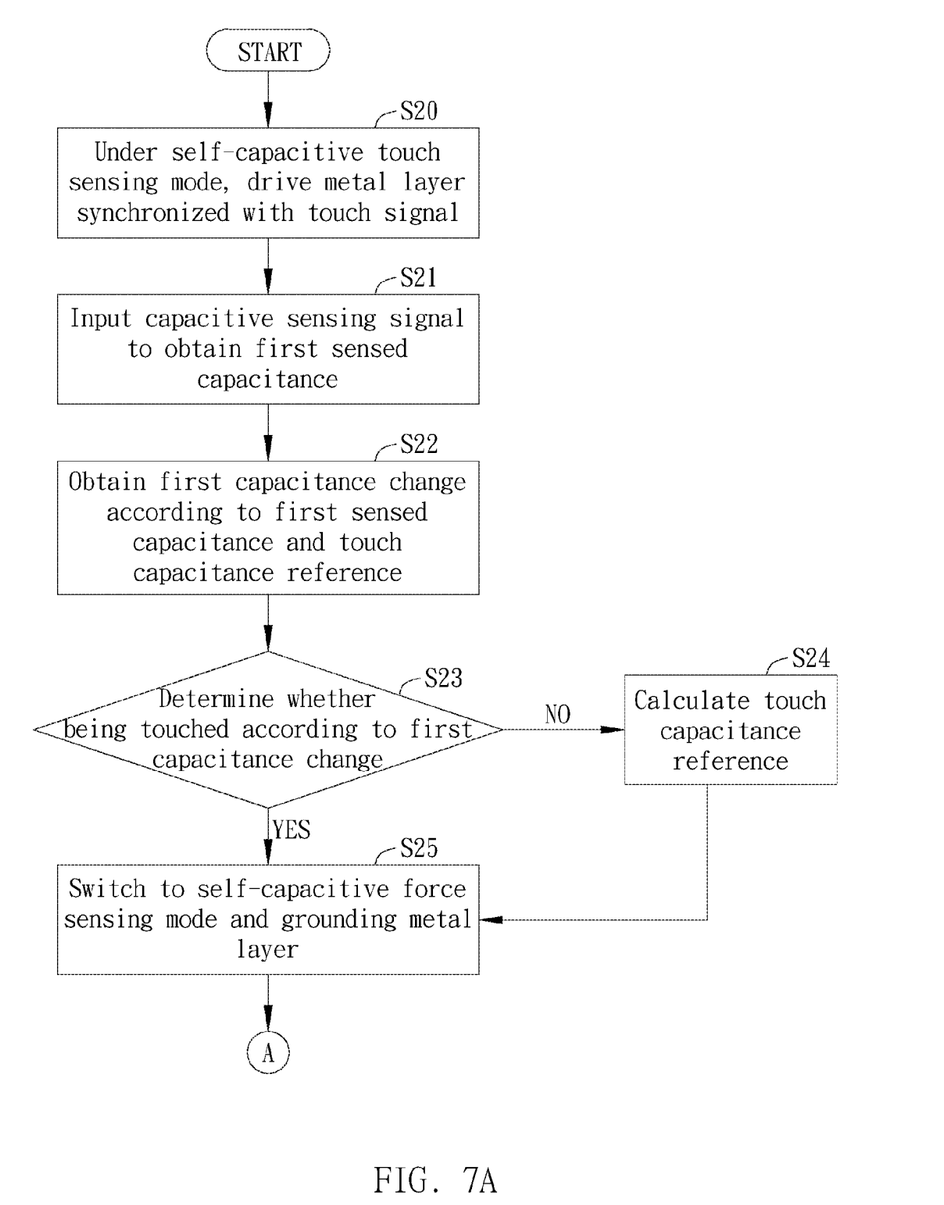
FIG. 7A and FIG. 7B illustrate a detailed flowchart of the self-capacitive touch and force sensing method of the invention.
Figure 7B:
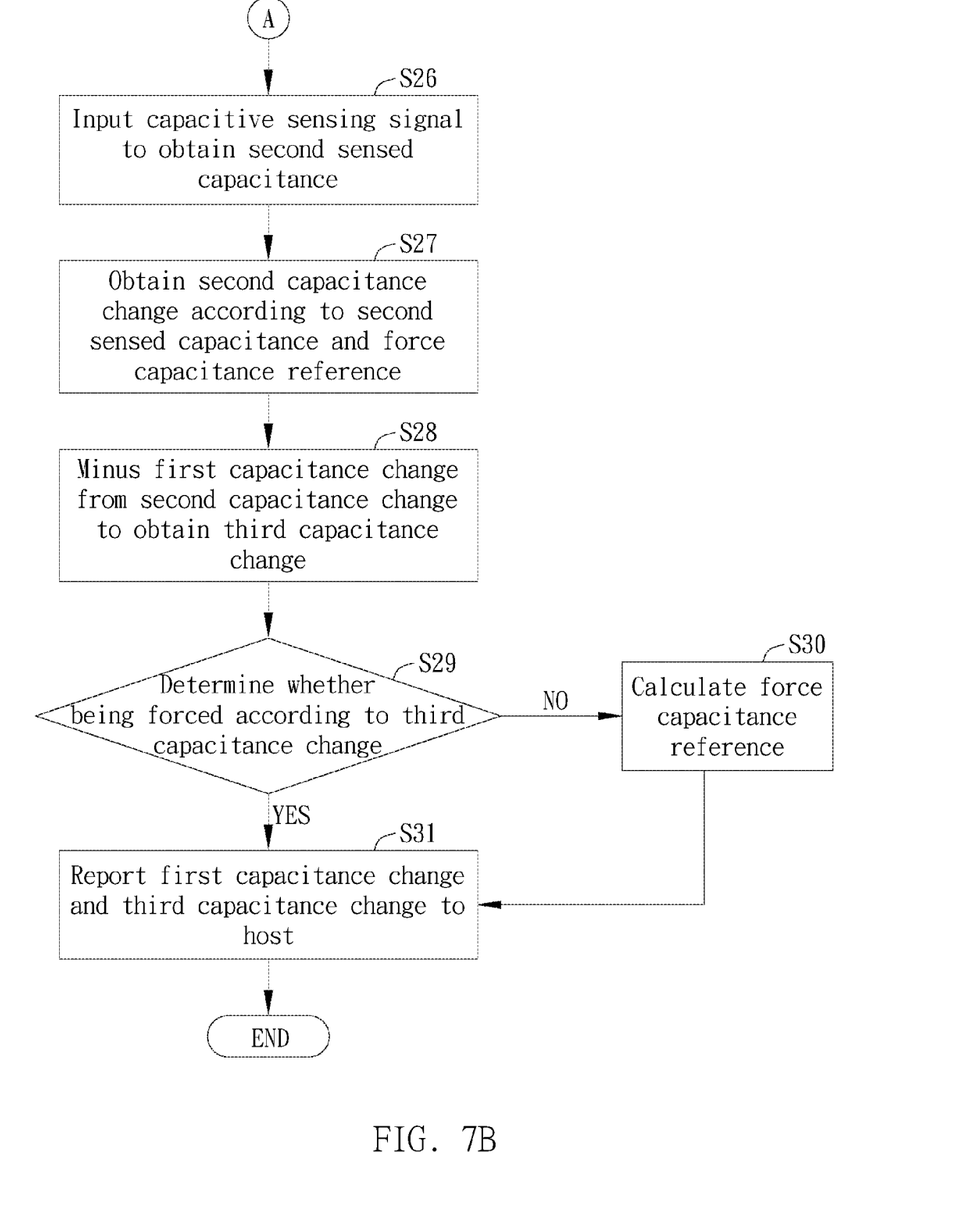

Then, please refer to FIG. 7A and FIG. 7B. FIG. 7A and FIG. 7B illustrate a detailed flowchart of the self-capacitive touch and force sensing method of the invention. As shown in FIG. 7A and FIG. 7B, the self-capacitive touch and force sensing method can include following steps.

Step S20: under the self-capacitive touch sensing mode, driving the metal layer (or the optical conductive layer) synchronized with the touch signal, so that there will be no capacitive effect between the sensing component layer and the metal layer (or the optical conductive layer);

Step S21: inputting the capacitive sensing signal to obtain the first sensed capacitance;

Step S22: obtaining the first capacitance change according to the first sensed capacitance and the touch capacitance reference;

Step S23: determining whether being touched or not according to the first capacitance change;

If the determining result of Step S23 is NO, then the method performs Step S24 to calculate and renew the touch capacitance reference;

If the determining result of Step S23 is YES, then the method performs Step S25 to switch to the self-capacitive force sensing mode and ground the metal layer (or the optical conductive layer), so that there will be capacitive effect between the sensing component layer and the metal layer (or the optical conductive layer);

Step S26: inputting the capacitive sensing signal to obtain the second sensed capacitance;

Step S27: obtaining the second capacitance change according to the second sensed capacitance and the force capacitance reference;

Step S28: the first capacitance change is minus from the second capacitance change to obtain the third capacitance change;

Step S29: determining whether being forced or not according to the third capacitance change;

If the determining result of Step S29 is NO, then the method performs Step S30 to calculate and renew the force capacitance reference; and If the determining result of Step S29 is YES, then the method performs Step S31 to report the first capacitance change (caused by touch) and the third capacitance change (caused by force) to the host.

Compared to the prior art, the self-capacitive touch and force sensing apparatus and the self-capacitive touch and force sensing method of the invention control the voltage level of the metal layer and the self-capacitive sensing component layer and perform digital processing to obtain accurate capacitance changes caused by touch and force under the condition of sharing sensing component in the touch sensing mode and the force sensing mode. The self-capacitive touch and force sensing apparatus and the self-capacitive touch and force sensing method of the invention can achieve the following advantages and effects:

(1) When the self-capacitive touch and force sensing apparatus of the invention performs self-capacitive touch sensing, the metal layer in its laminated structure will be driven to be synchronized with the touch signal, so that the self-capacitive sensing component layer can be prevented from the increasing of RC loading caused by the metal layer below; when the air gap layer between the self-capacitive sensing component layer and the metal layer is deformed by force, no effects of capacitance change will be generated. At this time, the self-capacitive sensing component layer will only sense the capacitance change caused by touch. Therefore, the external environmental noise from below can be effectively blocked to enhance the signal-noise ratio (SNR) of touch sensing.

(2) When the self-capacitive touch and force sensing apparatus of the invention performs self-capacitive force sensing, the metal layer in its laminated structure will be grounded to replace the conventional metal shielding layer, so that the self-capacitive sensing component layer can be prevented from the noise from below. When the air gap layer between the self-capacitive sensing component layer and the metal layer is deformed by force, there will be capacitance change generated and sensed by the self-capacitive sensing component layer. Therefore, the self-capacitive sensing component layer can sense the capacitance changes caused by touch and force at the same time.

(3) The self-capacitive touch and force sensing apparatus of the invention can obtain accurate capacitance change caused by force according to the combined capacitance change sensed under the self-capacitive force sensing mode and the touch capacitance change sensed under the self-capacitive touch sensing mode and multi-points force sensing can be also achieved.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A self-capacitive touch and force sensing apparatus capable of being operated in a self-capacitive touch sensing mode and a self-capacitive force sensing mode, the self-capacitive touch and force sensing apparatus comprising:
a metal layer;
a sensing component layer disposed above the metal layer;
an air gap layer formed between the metal layer and the sensing component layer; and
a processing module coupled to the metal layer and the sensing component layer;
wherein when the self-capacitive touch and force sensing apparatus is operated in the self-capacitive touch sensing mode, the metal layer is driven and synchronized with a touch signal, so that no capacitive effect between the sensing component layer and the metal layer and a first capacitance change is sensed; when the self-capacitive touch and force sensing apparatus is operated in the self-capacitive force sensing mode, the metal layer is grounded, so that there is a capacitive effect between the sensing component layer and the metal layer and a second capacitance change is sensed; the processing module obtains a third capacitance change according to the first capacitance change and the second capacitance change.

2. The self-capacitive touch and force sensing apparatus of claim 1, wherein the first capacitance change only comprises a capacitance change caused by touch.

3. The self-capacitive touch and force sensing apparatus of claim 1, wherein the second capacitance change comprises a capacitance change caused by touch and a capacitance change caused by force.

4. The self-capacitive touch and force sensing apparatus of claim 1, wherein the processing module minuses the first capacitance change from the second capacitance change to obtain the third capacitance change.

5. The self-capacitive touch and force sensing apparatus of claim 1, wherein the third capacitance change only comprises a capacitance change caused by force.

6. The self-capacitive touch and force sensing apparatus of claim 1, wherein the metal layer is in a whole piece form or a patterned form.

7. The self-capacitive touch and force sensing apparatus of claim 1, further comprising:
an optical conductive layer disposed between the metal layer and the air gap layer.

8. The self-capacitive touch and force sensing apparatus of claim 7, wherein the optical conductive layer is in a whole piece form or a patterned form.

9. The self-capacitive touch and force sensing apparatus of claim 1, wherein the self-capacitive touch and force sensing apparatus is applied to a self-capacitive touch panel.

10. The self-capacitive touch and force sensing apparatus of claim 9, wherein the self-capacitive touch panel has an in-cell laminated structure, an on-cell laminated structure or an out-cell laminated structure.

11. A self-capacitive touch and force sensing method applied to a self-capacitive touch and force sensing apparatus capable of being operated in a self-capacitive touch sensing mode and a self-capacitive force sensing mode, the self-capacitive touch and force sensing apparatus comprising a metal layer, a sensing component layer and an air gap layer, the sensing component layer being disposed above the metal layer, the air gap layer being formed between the metal layer and the sensing component layer, the self-capacitive touch and force sensing method comprising steps of:
when the self-capacitive touch and force sensing apparatus is operated in the self-capacitive touch sensing mode, driving and synchronizing the metal layer with a touch signal, so that no capacitive effect between the sensing component layer and the metal layer and a first capacitance change is sensed;
when the self-capacitive touch and force sensing apparatus is operated in the self-capacitive force sensing mode, grounding the metal layer, so that there is a capacitive effect between the sensing component layer and the metal layer and a second capacitance change is sensed; and
obtaining a third capacitance change according to the first capacitance change and the second capacitance change.

12. The self-capacitive touch and force sensing method of claim 11, wherein the first capacitance change only comprises a capacitance change caused by touch.

13. The self-capacitive touch and force sensing method of claim 11, wherein the second capacitance change comprises a capacitance change caused by touch and a capacitance change caused by force.

14. The self-capacitive touch and force sensing method of claim 11, wherein the processing module minuses the first capacitance change from the second capacitance change to obtain the third capacitance change.

15. The self-capacitive touch and force sensing method of claim 11, wherein the third capacitance change only comprises a capacitance change caused by force.

16. The self-capacitive touch and force sensing method of claim 11, wherein the metal layer is in a whole piece form or a patterned form.

17. The self-capacitive touch and force sensing method of claim 11, wherein the self-capacitive touch and force sensing apparatus further comprises an optical conductive layer disposed between the metal layer and the air gap layer.

18. The self-capacitive touch and force sensing method of claim 17, wherein the optical conductive layer is in a whole piece form or a patterned form.

19. The self-capacitive touch and force sensing method of claim 11, wherein the self-capacitive touch and force sensing apparatus is applied to a self-capacitive touch panel.

20. The self-capacitive touch and force sensing method of claim 19, wherein the self-capacitive touch panel has an in-cell laminated structure, an on-cell laminated structure or an out-cell laminated structure.

\* \* \* \* \*